Aug. 16, 1966  J. A. KOLOSOWSKY  3,266,548
METHOD AND MEANS FOR DEMOUNTING TIRES

Filed May 24, 1965  4 Sheets-Sheet 1

INVENTOR
JAMES A. KOLOSOWSKY
BY
ATTORNEY

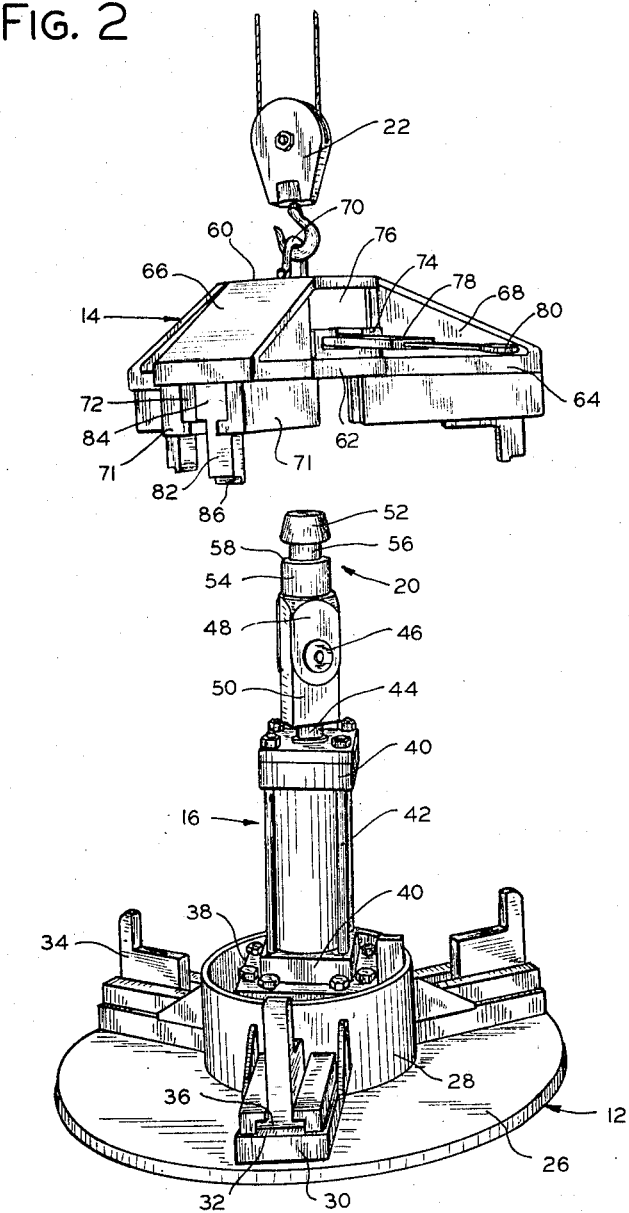

Aug. 16, 1966   J. A. KOLOSOWSKY   3,266,548
METHOD AND MEANS FOR DEMOUNTING TIRES
Filed May 24, 1965   4 Sheets-Sheet 3

INVENTOR
JAMES A. KOLOSOWSKY
ATTORNEY

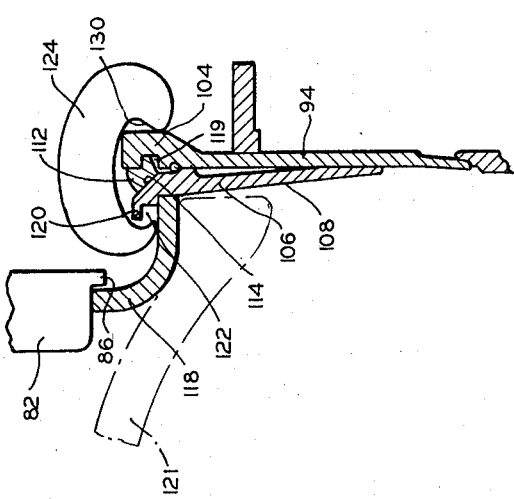
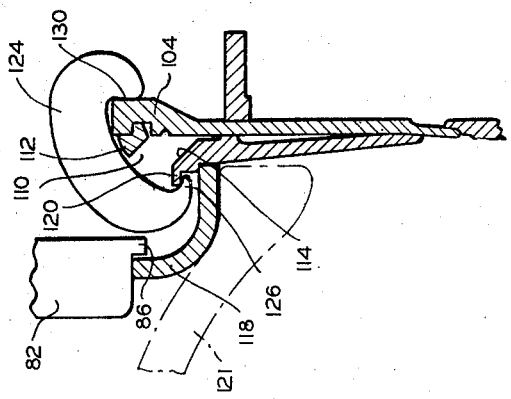
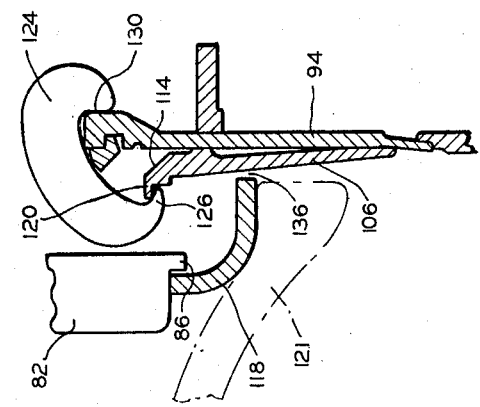
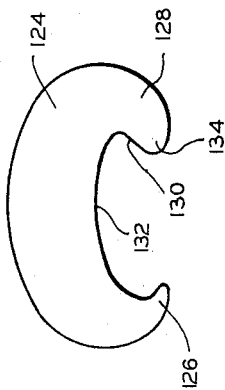
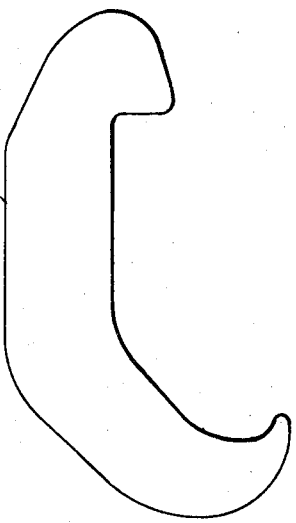
INVENTOR
JAMES A. KOLOSOWSKY
BY
ATTORNEY

United States Patent Office 3,266,548
Patented August 16, 1966

3,266,548
METHOD AND MEANS FOR DEMOUNTING TIRES
James A. Kolosowsky, Stevensville, Mich., assignor to Clark Equipment Company, a corporation of Michigan
Filed May 24, 1965, Ser. No. 458,253
9 Claims. (Cl. 157—1.33)

This invention relates to a new and improved method and means for demounting tires, particularly large tires which are used with trucks, construction and earth moving machinery, and the like.

Heretofore, the disassembly of large heavy-duty tires from wheel assemblies of the type used with the above-mentioned types of vehicular equipment has been an extremely difficult job. The method and means of the present invention affords a major improvement in the art which renders relatively easy the demounting of tires from such wheel assemblies.

It is an important object of the present invention to provide an improved method and means for demounting vehicle tires from wheel assemblies.

Another important object of the invention is to provide novel clamp means used in my method of demounting tires in conjunction with a hydraulic or other press assembly which renders possible the use of my novel method.

Other objects and advantages of the invention will become apparent to persons skilled in the art from the following description taken in conjunction with the accompanying drawings, wherein:

FIGURE 2 is a perspective view of the tire press in which the drive head assembly is disconnected from and elevated above the press;

FIGURES 5, 6 and 7 are broken-away sectional views showing a portion of the wheel assembly in various positions during actuation of the press to break away the tire from the wheel assembly, and showing particularly the relationship of the clamping means of my invention to the wheel assembly during such operation;

FIGURE 8 is a side elevational view showing one form of the clamp means of the invention; and FIGURE 9 is a side elevational view showing a modified form of the clamp means.

Figure 1:
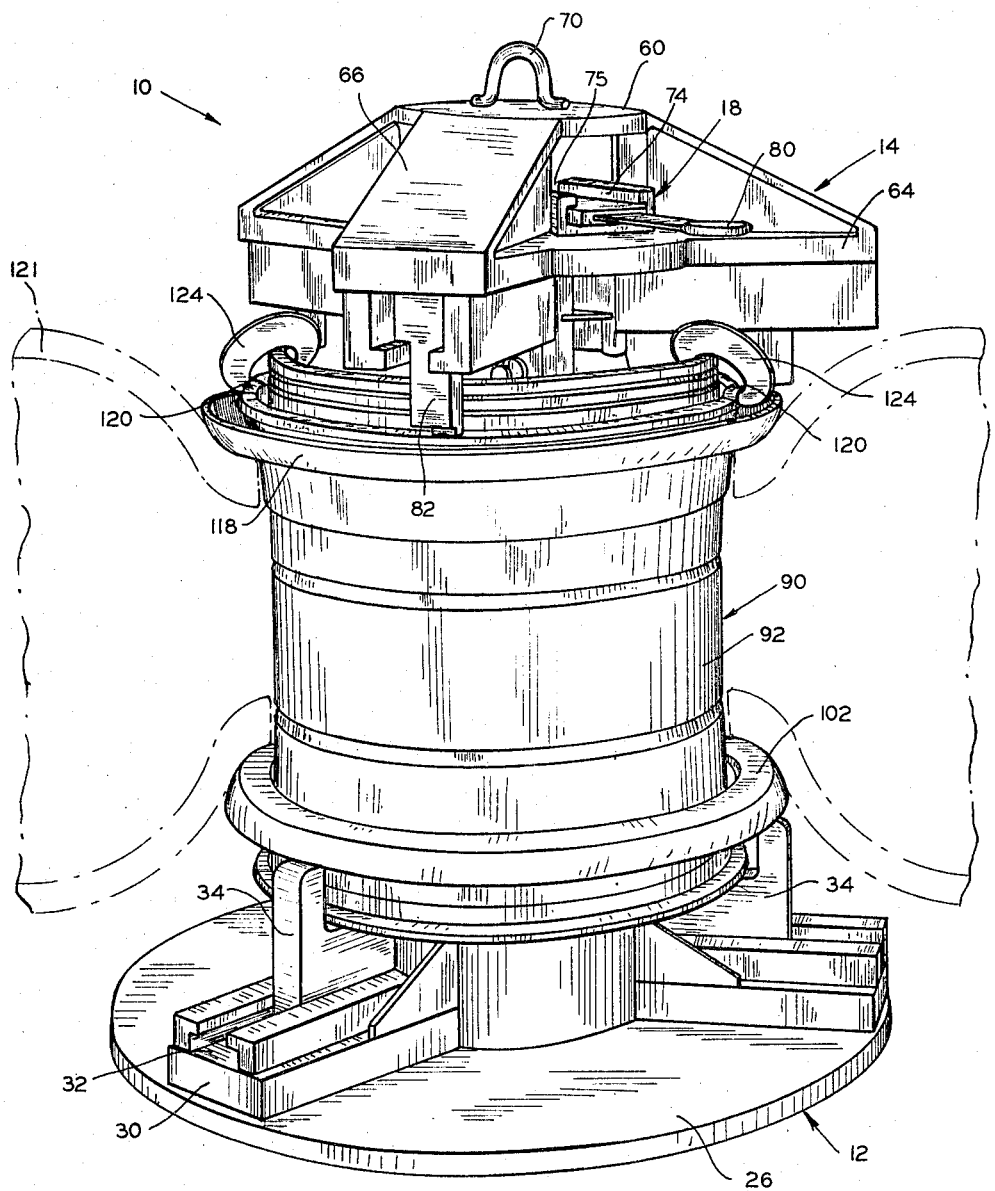
FIGURE 1 is a perspective view of a tire press and apparatus utilized therewith shown in conjunction with a tire and wheel assembly mounted thereon and ready for disassembly.

Referring now in detail to the drawings, a hydraulically actuated tire demounting press assembly is illustrated schematically at numeral 10. It comprises generally a press base assembly 12, a removable drive head assembly 14, a hydraulically actuated cylinder-piston assembly 16 for actuating the drive head up and down, and a locking assembly 18 which is a part of the drive head and is operable to secure the same to a drive head connector assembly 20, and to disconnect the drive head from the connector 20 whereas to permit the drive head to be elevated and removed from the hydraulic press 10, as by an overhead hoist 22.

The press base assembly 12 comprises a circular base plate 26 to which is secured an upwardly extending centrally located circular boss 28 and three radially extending track assemblies 30 each forming an inverted T-shaped track 32, said track assemblies being spaced at approximately 120° from each other. A generally L-shaped pusher dog 34 has a bottom flange 36 which forms with the horizontal leg of each pusher dog an inverted T-shaped section complementary to each track 32 and registrable therewith for adjustment in a radial direction. The cylinder-piston assembly 16 is mounted in a fixture located in and extending above cylindrical boss 28 which includes a hollow box shaped assembly 38 which is bolted to the face plate 26 and in which cylinder assembly 16 is mounted in a self-aligning bearing member, not shown, upper and lower fixtures 40 supporting the cylinder assembly in a vertical position by means of corner bolts 42.

The drive head connector assembly 20 is connected to piston rod 44 by means of a self-aligning bearing 46 which extends through bifurcated sides 48 of the lower end of the connector assembly 20 and to an enlarged box shaped end 50 of the piston rod. The upper end of the connector assembly 20 comprises tapered cylindrical connector member 52, a base connector member 54 which is integral with bifurcated portion 48, and a smaller diameter cylindrical member 56 connecting members 52 and 54 and forming annular groove 58 therebetween.

Figure 4:
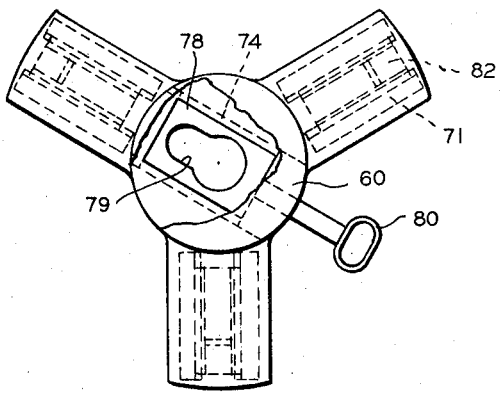
FIGURE 4 is a plan view of the drive head of the press.

Drive head assembly 14 comprises a welded assembly which includes an upper circular support plate 60, a lower support member 62 having three radially extending arms 64 spaced approximately 120° from each other, three connecting plates 66 securing the outer ends of arms 64 to peripheral portions of plate 60, triangular web support means 68 located between each arm 64 and plate 66, a lifting eye 70 secured to plate 60 for lifting and lowering the drive head assembly by hoist means 22, and a pair of laterally spaced, opposed L-shaped plate members 71 secured to the underside of each arm 64 and forming therewith a T-shaped channel 72. A channelled member 74 extends through open space 76 of the drive head, is secured to support member 62, has a central opening therein for receiving connector 20, and forms an inverted T-shaped track 75 for receiving a push-pull locking plate member 78 having a key-hole opening 79 therein (FIG. 4) and a manually actuated handle 80 connected thereto. When the drive head assembly 14 is lowered by hoist 22 over connector 20, outward movement of latch member 78 locks groove 58 of the connector assembly to the small opening in key-hole 79 thereby securing the drive head to the connector 20. An inverted L-shaped upper pusher dog 82 having a T-shaped upper section 84 is slidably located in the T-shaped channel section formed between each pair of members 71. Each pusher dog 82 includes a downwardly extending projection 86 at the inner side of the lower end thereof.

Figure 3:
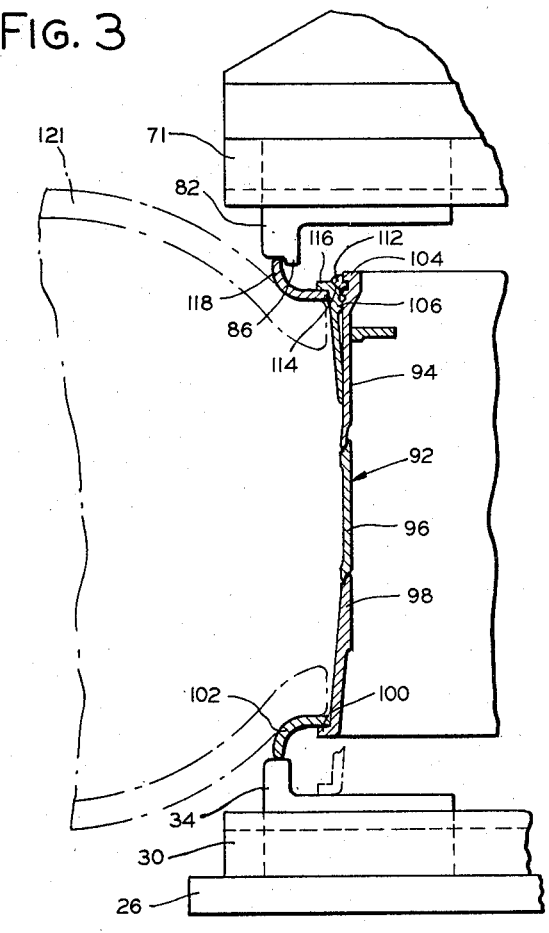
FIGURE 3 is a broken-away partial sectional view which illustrates the relationship between the wheel assembly and tire press prior to actuation of the press to break away the tire from the wheel assembly.

A wheel assembly of generally known construction is shown at numeral 90. It comprises a rim 92 having annular portions 94, 96 and 98 secured together as by welding, and wherein the lower end of rim portion 98 includes an annular rim flange 100 for retaining a lower wheel flange 102. Upper rim portion 94 terminates in a relatively thick rim base section 104 which is adapted to form an annular groove 110 with rim base 104 and an annular tire bead seat band 106 having a tapered bead seating surface 108 surrounding rim portion 94. A split locking ring 112 having the cross-sectional configuration shown registers with groove 110 and abuts in mating relation an annular tapered surface 114 of seat band 106. An outer annular flange portion 116 (FIG. 3) of the seat band 106 limits the outward movement of a tire retainer flange 118. With the parts of the wheel assembled and the tire 121 mounted on the wheel and inflated, as shown in FIG. 3, tire retainer flanges 102 and 118 are held by the annular bead portions of the tire in fixed and rigid location in relation to rim flanges 100 and 116, the configuration and location of locking ring 112, which is held in an annular groove 119 of the rim base 104, preventing outward axial movement of seat band 106 by engagement of tapered surface 114 with the adjacent tapered surface of the locking ring. The wheel assembly therefore maintains the bead portions of the tire in securely fixed relation to all parts of the wheel assembly.

Located on the flange 116 of the bead seat band in approximately 180° spaced relation is a pair of lugs 120 which project from the flange 116 for providing a pair of apertures 122, each of which is adapted to receive a hooked end 126 of a generally C-shaped bead seat band lock 124. When a wheel and tire assembly is mounted on the press for demounting the tire, hooked end 126 is located in a position to engage aperture 122 and hooked end 128 is located to abut the one vertical surface of rim base 104, as shown in FIG. 5, for a purpose to be described.

In operation, the lower pusher dogs 34 are adjusted in tracks 32 so that any given size of wheel and tire assembly when located on the demounting press is supported by the vertical leg portions of pusher dogs 34 in abutment with the lower tire flange 102, as shown in FIG. 3. With the wheel assembly thus supported, hoist 22 lowers the drive head 14 on connector assembly 20 until groove 58 is coplanar with key-hole aperture 79, whereupon handle 80 is actuated outwardly to engage the groove with the small end of aperture 79, thereby securing together the drive head and base assemblies of the press 10 with the actuator assembly 16. Upper pusher dogs 82 are adjusted longitudinally of tracks 72 so that projection 86 is located radially inside of the outer edge of upper tire flange 118, and said outer edge abuts the adjacent horizontal surface of each pusher dog. C-clamps 124 are then located as aforesaid between the lugs 120 and rim base 104. Pressure fluid is directed to the upper end of actuator assembly 16 which pulls the drive head assembly 14 downwardly towards the base assembly 12. The bead seat band 106 has a loose running fit with rim portion 94. Usually heretofore it has been extremely difficult to separate the bead seat band from the upper tire flange 118 during demounting operations, particularly since during use a serious rusting condition is likely to occur between the annular area of contact of the tire flange and seat band, thereby aggravating the problem of separating these parts so that the tire can be demounted from the wheel. In the present construction the use of C-clamps 124 assures the separation of the upper tire flange from the seat band in the following manner: Retraction of actuator 16, following evacuation of the air from the tire, forces the bead portion of the tire downwardly with flange 118, as shown in FIG. 6. It is important note that both the upper and lower pusher dogs operate not directly on the side walls of the tire but contact only the respective tire flanges 102 and 118, thus preventing damage to the side walls or bead portion of the tire which would otherwise likely occur if the pusher dogs operated directly on the tire in view of the relatively large forces required of the actuator in order to separate the tire from the bead seats.

It will be noted that during depression of the tire flange to the FIG. 6 position the C-clamp is caused to pivot so that the hook portion 126 is engaged in aperture 122 and hook portion 128 engages the adjacent vertical surface of rim base 104 fully across a flat surface 130 which is located on the inside of hook portion 128. It should be noted that during this phase of the operation, pivotal movement of the C-clamp as aforesaid is assured by the design of the large hooked end 128 which provides a curved end portion 134 about which the C-clamp pivots until full surface engagement between the rim base and flat surface 130 prevents further pivotal movement of the clamp. Continued application of pressure fluid in actuator 16 causes a considerable tension to be applied between the hooked ends of each C-clamp until the entire flange 118 breaks away from the bead seat band and is actuated further downwardly to the FIG. 7 position at which the C-clamp, locking rings 112 and the bead seat band are readily removable from the rim while the actuator holds the tire in the depressed condition illustrated providing an annular clearance space 136 between the seat band and tire flange which facilitates removal of the parts associated with the rim as aforesaid.

During operation of actuator 16 the bottom tire flange is also broken away from the rim flange 100 so that the rim is actuated downwardly into abutment with the horizontal leg portions of lower pusher dogs 34, as shown in broken lines in FIG. 3. The sequence in which tire flanges 102 and 118 break away with the respective tire bead portions from the outer sections of the rim is immaterial to the operation of my invention. It will be understood that the force resisting such break away action at one or the other sides of the tire may vary considerably, but this does not affect the operation since the actuator adjusts automatically the drive head to the existing condition whether, for example, rim portion 100 breaks away from tire flange 102 before or after breakaway action of tire flange 118. In any event, the actuator 116 is retracted until rim portion 100 abuts the horizon portions of pusher dogs 34 and the lower horizontal surfaces of tracks 72 are actuated into abutment with the upper horizontal surface of rim base 104, in which position the wheel parts are related as shown in FIG. 7. Then, following removal of the C-clamps from lugs 120, the bead seat band slides downwardly along rim portion 94 until it is again supported by tire flange 118. The locking ring 112 is then removed from the assembly, following which actuator 16 is pressurized in extension to raise the drive head above the wheel rim, whereupon handle 80 is actuated inwardly to unlock connector 20, and the drive head is removed from the tire press by hoist 22. The seat band and upper tire flange are then removed, the tire removed from the rim, and the rim and lower flange 102 removed from the press.

It will be understood that the hydraulic press described above is usable with wheel assemblies of different diameters and designs all of which utilize, however, upper and lower tire flanges and a bead seat band generally of the character described above, thus necessitating the use of a special clamp member such as the C-clamp described, for facilitating the separation of the one tire flange from the bead seat band during demounting operations. The particular design of the tire and wheel assembly will dictate the clamp design required for the aforementioned purpose. For example, one exemplary modification of the C-clamp design shown in FIG. 8 is illustrated in FIG. 9 at numeral 140 for use with a wheel assembly of different design than that illustrated in the drawings. It will also be appreciated that variations in the design of the hydraulic press to suit requirements are well within the scope of the invention. For instance, the lower pusher dogs 34 can be replaced with pusher dogs of different heights in order to maintain the proper working height of the wheel assembly and press, depending upon the wheel design.

Although I have described and illustrated a preferred embodiment of my invention, it will be understood by those skilled in the art that modifications may be made in the structure, form and relative arrangement of parts without departing from the spirit and scope of the invention. Accordingly, it should be understood that I intend to cover by the appended claims all such modifications which fall within the scope of my invention.

I claim:

1. Apparatus for demounting tires from wheels having a rim, an annular tire flange at one side of the rim and tire bead seat means surrounding the rim at said one side for holding the adjacent tire flange, comprising press means for actuating the flange axially inwardly of the wheel, and clamp means locatable between the rim and bead seat means permitting limited inward axial movement of the bead seat means with the flange, said flange being further actuated by the press means axially of the wheel following said limited movement of the bead seat means.

2. Apparatus as claimed in claim 1 wherein said clamp means has a generally C-shaped configuration and is adapted to pivot relative to the rim during said limited axial movement of the bead seat means following which said clamp means is in a locked position relative to the rim for preventing further axial movement of the bead seat means.

3. Apparatus as claimed in claim 1 wherein said press means comprises base means supporting one side of the tire and wheel assembly, a removable drive head assembly having a plurality of annularly spaced downwardly depending members for abutting the said tire flange, and an actuator assembly connectible selectively to said drive head assembly for actuating the latter axially inwardly of the wheel for demounting the tire therefrom.

4. Apparatus as claimed in claim 1 wherein said bead seat band has a pair of spaced lugs located thereon for receiving one end of said clamp means, the other end of said clamp means being adapted to pivot into locking relation with a portion of the rim during said inward axial movement of the bead seat means.

5. Apparatus as claimed in claim 4 wherein said other end of the clamp means includes a rounded surface for permitting pivotal movement of the clamp means relative to the rim and a flat surface adapted to engage a corresponding flat surface of the rim at the limit of inward axial movement of the bead seat means.

6. A method for demounting tires from wheels having a rim, an annular tire flange at one side of the rim and tire bead seat means surrounding the rim at said one side for holding the adjacent tire flange, comprising the steps of connecting clamp means between the rim and bead seat means, actuating the flange and bead seat means axially inwardly of the wheel until the clamp means locks the bead seat means against further axial movement, and actuating the flange means further axially inwardly to separate the flange from the bead seat means.

7. A method as claimed in claim 6 comprising the further steps of removing the clamp means and bead seat means from the rim, and actuating the flange axially outwardly of the rim for subsequent removal of the tire therefrom.

8. A method for demounting tires from wheels having a rim, annular tire flanges at opposite sides of the rim and tire bead seat means surrounding the rim at the one side thereof for holding the adjacent one tire flange by means of a power operated press having a base, a removable drive head and power operated connector means for connecting the drive head to the base and for actuating the drive head downwardly to depress the said one flange, comprising the steps of mounting the tire and wheel assembly on the press base, securing the drive head to the connector, connecting clamp means between the rim and bead seat means, actuating the said one flange and bead seat means together axially inwardly of the wheel until the clamp means locks the bead seat means against further inward axial movement, and further actuating the said one flange axiallly inwardly of the wheel to separate the said one flange from the bead seat means.

9. A method as claimed in claim 8 comprising the further steps of removing the clamp means and the bead seat means, removing the drive head from the connector, and actuating the said one flange axially outwardly of the wheel to condition the tire for removal therefrom.

References Cited by the Applicant
UNITED STATES PATENTS

| | | |
|---|---|---|
| 2,479,432 | 8/1949 | Tillotson. |
| 2,488,376 | 11/1949 | Clauser. |
| 2,504,760 | 4/1950 | Tillotson. |
| 2,762,424 | 9/1956 | Zito. |
| 2,890,745 | 6/1959 | Pientkewic. |

GRANVILLE Y. CUSTER, JR., *Primary Examiner.*